United States Patent [19]

Rasanen et al.

[11] Patent Number: 5,956,332
[45] Date of Patent: Sep. 21, 1999

[54] HIGH-SPEED DATA TRANSMISSION IN MOBILE COMMUNICATION NETWORKS

[75] Inventors: Juha Rasanen, Espoo, Finland; David Lin, Frisco, Tex.; Harri Honkasalo; Zhi-Chun Honkasalo, both of Bedford, Tex.

[73] Assignee: Nokia Telecommunications Oy, Espoo, Finland

[21] Appl. No.: 08/675,892

[22] Filed: Jul. 5, 1996

Related U.S. Application Data

[63] Continuation-in-part of application No. PCT/FI95/00673, Dec. 8, 1995.

[30] Foreign Application Priority Data

Dec. 9, 1994 [FI] Finland ..................................... 945817

[51] Int. Cl.⁶ .............................. H04Q 7/30; H04B 7/26; H04J 3/16
[52] U.S. Cl. ........................... 370/342; 370/468; 375/200
[58] Field of Search ................................... 370/329, 342, 370/465, 468; 375/200, 208

[56] References Cited

U.S. PATENT DOCUMENTS

| | | | |
|---|---|---|---|
| 5,235,614 | 8/1993 | Bruckert et al. | 375/200 |
| 5,260,989 | 11/1993 | Jenness et al. | 379/59 |
| 5,430,761 | 7/1995 | Bruckert et al. | 375/200 |
| 5,440,542 | 8/1995 | Proctor et al. | 370/18 |
| 5,583,851 | 12/1996 | Kato et al. | 370/342 |
| 5,583,859 | 12/1996 | Feldmeier | 370/471 |
| 5,793,744 | 8/1998 | Kanerva et al. | 370/209 |

FOREIGN PATENT DOCUMENTS

| | | | |
|---|---|---|---|
| 0 587 980 | 3/1994 | European Pat. Off. | H04L 12/56 |
| 0 614 323 | 9/1994 | European Pat. Off. | H04Q 11/04 |
| 0 615 393 | 9/1994 | European Pat. Off. | H04Q 7/04 |
| WO 91/14319 | 9/1991 | WIPO | H04J 3/16 |
| 95/31879 | 11/1995 | WIPO | H04Q 7/22 |
| WO 95/31878 | 11/1995 | WIPO | H04Q 7/22 |

OTHER PUBLICATIONS

"An Overview of the Application of Code Division Multiple Access (CDMA) To Digital Cellular Systems and Personal Cellular Networks", May 21, 1992., Qualcomm.

*Primary Examiner*—Melvin Marcelo
*Attorney, Agent, or Firm*—Pillsbury Madison & Sutro LLP

[57] ABSTRACT

In a mobile communication system, two or more parallel traffic channels are allocated for high-speed data transmission over the radio path. Different channel numbers (e.g., ch0, ch1, ch2, ch3) are assigned to these parallel traffic channels for the duration of a connection. The data of a high-speed data signal are inserted at the distribution point of the transmission end of the connection, into frames, each of which is provided with a channel number indicating the parallel traffic channel used for the transmission. The frames transmitted in a traffic channel always contain the same channel number during the whole call. The frames are divided into parallel traffic channels in a sequential order according to the channel numbering. At the reception end, of the connection, the data contained in the frames are reassembled into a high-speed data signal in the sequential order according to the channel numbers provided in the frames. Additionally, frame numbering may be used within each of the traffic channels so that at least two successive frames always have a different frame number (e.g., fr0, fr1). As a consequence, the allowed delay offset between the traffic channels increase with the number of the frame numbers, and the order of the frames maintained under any circumstances.

27 Claims, 7 Drawing Sheets

| OCTET NO. | BIT NUMBER | | | | | | | |
|---|---|---|---|---|---|---|---|---|
| | 1 | 2 | 3 | 4 | 5 | 6 | 7 | 8 |
| 0 | 0 | 0 | 0 | 0 | 0 | 0 | 0 | 0 |
| 1 | 1 | D1 | D2 | D3 | D4 | D5 | D6 | S1 |
| 2 | 1 | D7 | D8 | D9 | D10 | D11 | D12 | X |
| 3 | 1 | D13 | D14 | D15 | D16 | D17 | D18 | S3 |
| 4 | 1 | D19 | D20 | D21 | D22 | D23 | D24 | S4 |
| 5 | 1 | E1 | E2 | E3 | E4 | E5 | E6 | E7 |
| 6 | 1 | D25 | D26 | D27 | D28 | D29 | D30 | S6 |
| 7 | 1 | D31 | D32 | D33 | D34 | D35 | D36 | X |
| 8 | 1 | D37 | D38 | D39 | D40 | D41 | D42 | S8 |
| 9 | 1 | D43 | D44 | D45 | D46 | D47 | D48 | S9 |

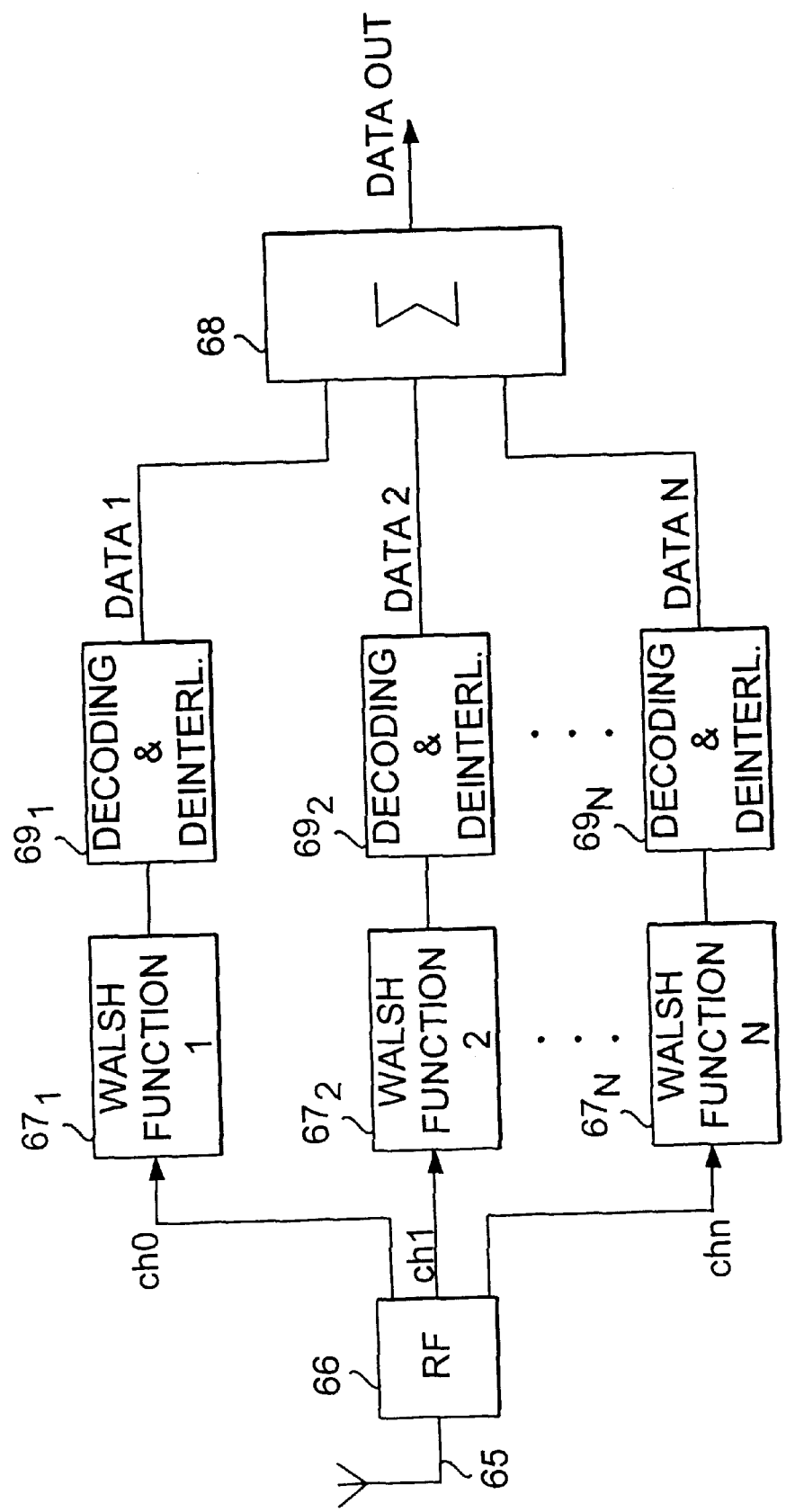

HIGH-SPEED DATA TRANSMISSION IN MOBILE COMMUNICATION NETWORKS

RELATED APPLICATIONS

This is a continuatiation-in-part (CIP) of International PCT Application PCT/FI95/00673, filed on Dec. 8, 1995.

FIELD OF THE INVENTION

The invention relates to high-speed data transmission in digital mobile communication networks.

BACKGROUND OF THE INVENTION

There are several multiple access modulation techniques for facilitating communications in which a large number of mobile user are present. These techniques include time division multiple access (TDMA), code division multiple access (CDMA) and frequency division multiple access (FDMA).

In TDMA radio telecommunication systems, the communication on the radio path is carried out time-divisionally in successive TDMA frames each of which consists of several time slots. A short information packet is transmitted in each time slot as a radio frequency burst having a finite duration and consisting of a group of modulated bits. Time slots are mainly used for carrying control channels and traffic channels. Speech and data are transmitted on traffic channels. Signalling between a base station and mobile subscriber stations is carried out on the control channels. One example of a TDMA radio system is a pan-European mobile communication system GSM (Global System for Mobile Communications).

CDMA is a modulation and multiple access scheme based on spread spectrum communication. Unlike FDMA or TDMA, in CDMA a large number of CDMA signals (users) simultaneously share the same wide band radio channel, typically 1.25 MHz. Pseudorandom noise (PN) binary codes, so called spreading codes, are used to distinguish between different CDMA signals, i.e traffic channels on a wide band radio channel. A separate spreading code is used over each connection between a base station and a subscriber terminal. In other words, the narrow-band data signal of the user is conventionally multiplied by the dedicated spreading code and thereby spread in bandwidth to the relatively wide band radio channel. The signals of the users can be distinguished from one another in the receivers on the basis of the unique spreading code of each connection, by using a correlator which accepts only a signal energy from the selected spreading code and despreads its spectrum into a narrow-band signal. The other users' signals, whose spreading codes do not match one another or that in use by the exemplary user now being discusses, are not despread in bandwidth and as a result, contribute only to the noise and represent a self-interference generated by the system. The spreading codes of the system are preferably selected in such a way that the codes used in each system cell are mutually orthogonal, i.e. they do not correlate with each other. Thus, in the CDMA systems, the spreading code unique to each user or user' signal provides a traffic channel in a similar sense as a time slot in the TDMA systems. CDMA is described in more detail in the document: "An overview of the application of code division multiple access (CDMA) to digital cellular systems and personal cellular networks", Qualcomm Incorporated, 1992, USA, (Document Number EX60-10010).

In traditional TDMA and CDMA mobile communications systems, the maximum data rate at the radio interface is relatively low.

In traditional mobile systems each mobile station is allocated a single traffic channel for data or speech transmission. Thus, in the GSM system, for example, a common carrier wave can carry up to eight parallel connections to different mobile stations. The maximum data transfer rate on one traffic channel is limited to a relatively low value according to the available bandwidth and channel coding and error correction used in the transmission, e.g. 9.6 kbit/s or 12 kbit/s in the GSM system. In the GSM system, a half-rate (max. 4.8 kbit/s) traffic channel can also be selected for low speech coding rates. A half-rate traffic channel is established when a mobile station operates in a specific time slot only in every second frame, that is, at half rate. Another mobile station operates in every second frame in the same time slot. Thus, in terms of the number of subscribers, the capacity of the system can be doubled, that is, as many as 16 mobile stations can operate on the same carrier at the same time.

In recent years, the need for high-speed data services has grown significantly. For example, transmission rates of 64 kbit/s or higher are needed for utilizing the circuit switched digital data services of the ISDN (Integrated Services Digital Network). Higher transmission rates, such as 14.4 kbit/s, are needed for data services of the public switched telephone network PSTN, such as modem and class G3 telefaxes. Mobile video service is one area of growth in mobile data transmission that requires higher transmission rates than 9.6 kbit/s. Security surveillance by cameras and video databases are examples of these services. The minimum data rate in video transmission may be 16 or 32 kbit/s, for example.

The transmission rates of present mobile communication networks are not, however, sufficient for satisfying these new requirements.

One solution, disclosed in international patent application WO95/31878, is to allocate to one high-speed data transmission two or more parallel traffic channels on the radio path. A high-speed data signal is divided into these parallel traffic channels at the transmission end for the transmission over the radio path and it is reassembled at the reception end. Thus, data transmission services are provided in which, depending on the number of the allocated traffic channels, the transmission rate may be up to eight times higher in comparison with the standard transmission rate. For example, in the GSM system two parallel traffic channels provide a transmission rate of 2×9.6 kbit/s, which is sufficient for a modem or a telefax of 14.4 kbit/s. Six parallel traffic channels enable a transmission rate of 64 kbit/s.

In using parallel traffic channels, the problems are how to divide the data flow between parallel transparent traffic channels and how to synchronize the reassembling of data received from the parallel traffic channels.

SUMMARY OF THE INVENTION

The object of the present invention is to eliminate this problem.

This object is achieved with a method for high-speed data transmission over an air interface between a mobile station and a fixed mobile communication network in a digital mobile communication system, this method comprising steps of:

allocating to a mobile station at least two parallel traffic channels having mutually different channel numbers identifiers assigned for the duration of a connection for transmission of a high-speed data signal, when the data transmission rate required by the high-speed data signal exceeds a maximum transmission rate of one traffic channel, dividing the frames into the allocated traffic channels in the sequential order according to the channel numbering and transmitting them to the reception end and, reassembling the data in the frames into a high-speed data signal in the sequential order according to the channel numbering at the reception end.

The invention also relates to a digital mobile communication system, comprising:

at least one mobile station having a data transmitter and a data receiver, a mobile communications network having a data transmitter and a data receiver, the mobile communication network being arranged to allocate to a mobile station two or more parallel traffic channels having mutually different channel numbers during the connection for transmission of a high-speed data signal over an air interface between the mobile station and the mobile communication network, when the transmission rate required by the high-speed data signal is higher than a maximum transmission rate of one traffic channel, the data transmitters being arranged to insert the data from the high-speed data signal into frames and to divide the frames into the allocated traffic channels in the sequential order according to the channel numbering and, the data receivers being arranged to reassemble the data in the frames into a high-speed data signal in the sequential order according to the channel numbering.

In practing the invention, different channel numbers are assigned to the parallel traffic channels for the duration of the connection. The data from a high-speed data signal are inserted into frames at the distribution point of the transmission end, each of the frames being assigned a channel number indicating the parallel traffic channel used for the transmission. The same channel numbering is maintained for the whole duration of the call. The frames are divided into parallel traffic channels in the sequential order according to channel numbering, the first frame into the first channel, the second frame into the second channel, etc., and are transmitted to the assembly point of the reception end in which the data in the frames are re-assembled into a high-speed data signal in the sequential order according to the channel numbering.

The length of the frame determines the maximum value for the relative transmission delays between parallel traffic channels which can be tolerated without losing the order of the frames at the reception. In order that the tolerable delay offset would be longer, the present invention employs frame numbering within each of the traffic channels, so that at least two successive frames always have a different frame number. Then, the allowed delay offset between the traffic channels will increase in proportion to the number of frame numbers, it will be at least doubled, and the order of the frames can be retained under any circumstances. If two frame numbers are used, e.g. 1-bit numbering 0 and 1, the frames of the traffic channel are numbered at the transmission end in the following way: 0, 1, 0, 1, 0, 1, . . . . If four frame numbers are used, e.g. 2-bit numbering, the frames of the traffic channel are numbered at the transmission end in the following way: 0, 1, 2, 3, 0, 1, 2, 3, . . . . Then, in the case of eight parallel traffic channels, for example, the first eight frames are transmitted with frame number 0, one frame in each traffic channel, the subsequent eight frames are transmitted with frame number 1, etc. The high-speed data signal is reassembled at the reception end by using the channel numbering, and frame numbers contained in the frames.

In CDMA systems, the channel numbering may be implicitly provided by spreading codes, such as the Walsh codes, and the frames do not carry any dedicated frame numbers.

In an embodiment of the invention, the frames are frames, in compliance with CCITT recommendation V.110. In V.110 frames status bits are transferred to carry channel control information for synchronization when entering and leaving a data transmission mode as well as for a transparent transmission of status data between data transmission equipments during the data transmission mode. In accordance with the recommendation, each status data is transmitted as replicated in two or four status bits inside the V.110 frame, and the change of the status state is confirmed only if the same state is in every bit. In this way, the effect of short inferences is filtered from the transmission of statuses.

As in the present invention the same status data is transmitted through several parallel traffic channels in the data transmission mode, there are "extra" redundant status bits in the frames of each traffic channel, the omission of which does not have any effect on the number of the replicated status bits, nor on the bit error rate of the status signals. For example, in the case of two parallel channels, a double number of status bits will be transferred, half of which are therefore redundant. In the preferred embodiment of the invention, these redundant status bits are used for channel and frame numbering, so that channel numbering is carried in each frame within the channel. At the expense of the bit error ratio, more status bits than just the redundant bits may be used for channel and frame numbering.

BRIEF DESCRIPTION OF THE DRAWINGS

In the following, the invention will be explained by means of preferred embodiments with reference to the accompanying drawings, in which.

FIGS. 6, 7A and 7B illustrate a high-speed data transmission according to the present invention over N parallel CDMA traffic channels and;

DETAILED DESCRIPTION OF PREFERRED EMBODIMENTS OF THE INVENTION

The present invention can be applied to a high-speed data transmission in digital mobile communication systems utilizing various multiple access methods, such as TDMA or CDMA. In different multiple access methods the physical concept of traffic channel varies, being primarily defined by a time slot in TDMA systems, a spreading code in CDMA systems, a radio channel in FDMA systems, a combination thereof, etc. The basic concept of the present invention is, however, independent of the type of the traffic channel and the multiple access method used.

Figures 1, 4:
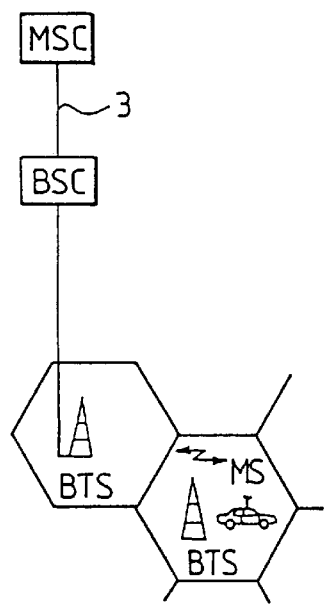
FIG. 1 illustrates a part of one mobile communication system to which the invention may be applied.
FIG. 4 shows the V.110 frame structure.

Examples of mobile communications systems include the pan-European digital mobile communication system GSM, DCS1800 (Digital Communication System), a mobile communication system according to EIA/TIA Interim Standarding IS/41.3, etc. The invention will be described in the following by using a GSM system type of mobile communication system as an example, without restricting thereto. FIG. 1 presents very briefly the basic structural parts of the GSM system, without further specifying the features and other elements of the system. With regard to a more detailed description of the GSM system, a reference is made to the GSM Specifications and to *The GSM System for Mobile Communications*, by M. Mouly & M. Pautet, Palaiseau, France, 1992, ISBN:2-9507190-0-0-7.

A mobile services switching center MSC attends to the switching of incoming and outgoing calls. It carries out tasks similar to those of the exchange in a public switched telephone network (PSTN). In addition, it carries out functions characteristic of only mobile telephone traffic, such as subscriber location management in cooperation with the network subscriber registers. Mobile stations MS are connected to the center MSC by means of base station systems BSS. The base station system BSS comprises a base station controller BSC and base stations BTS. For the sake of clarity, FIG. 1 shows only one base station system, in which the base station controller BSC is connected to two base stations having one mobile station MS within their respective areas of coverage.

The GSM system is a time division multiple access (TDMA) system in which the operation on the radio path takes place on the time division principle in successive TDMA frames each comprising several time slots. A short information packet is transmitted in each time slot as a radio frequency burst having a finite duration and consisting of a group of modulated bits. Time slots are mainly used for carrying control channels and traffic channels. Speech and data are transmitted on traffic channels. Signalling between a base station and mobile subscriber stations is carried out on the control channels.

The channel structures used at the radio interface of the GSM system are defined more closely in ETSI/GSM Specification 05.02. In normal operation, one time slot on one of the carrier frequencies is allocated to a mobile station MS as a traffic channel (single slot access) at the beginning of a call. The mobile station MS synchronizes to this time slot for transmitting and receiving radio frequency bursts. During the time remaining in the frame, the MS carries out various measurements. Finnish Patent Application 942,190 discloses a process in which two or more time slots are allocated from the same TDMA frame to a mobile station MS that requires a data transmission with a higher rate than that provided by one traffic channel. With respect to closer details of this procedure, a reference is made to that patent application.

In the following, the procedure is described with reference to FIG. 2 as one way to carry out high-speed data transmission based on several parallel traffic channels in a radio system. It should be noted that it is essential to the invention only that a transmission connection comprising many parallel traffic channels be established, and the invention is directed to carrying out the data transmission and synchronizing over such connection.

Figure 2:
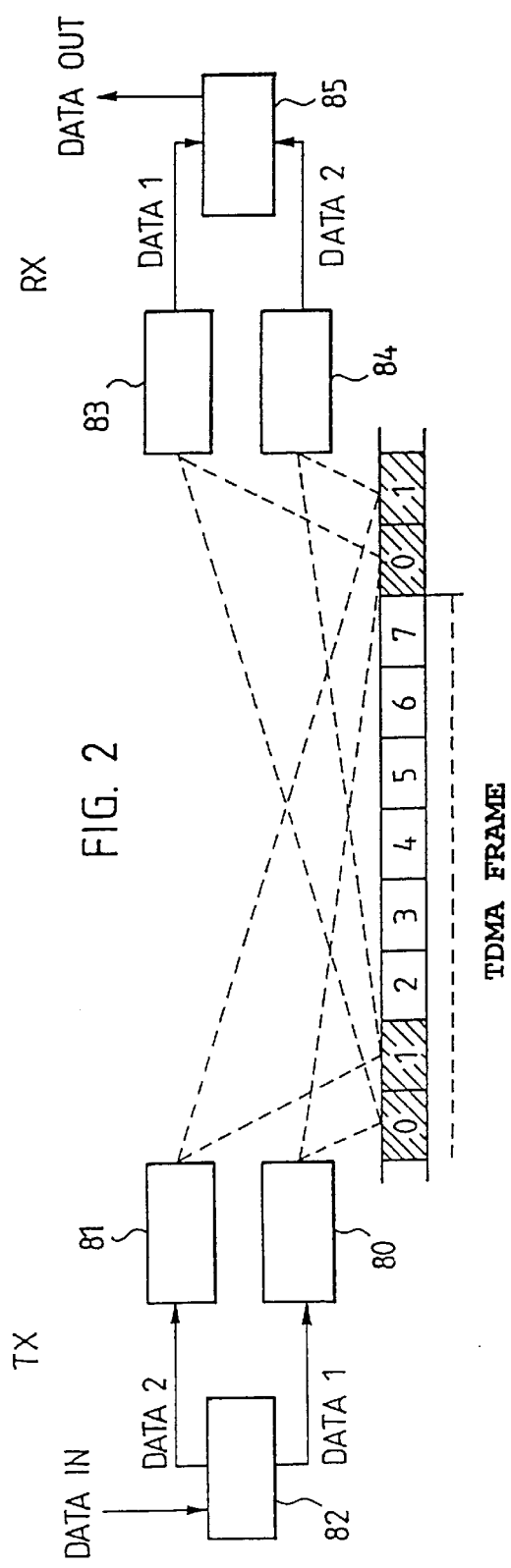
FIG. 2 illustrates a high-speed data transmission in two TDMA time slots on the radio path.

FIG. 2 shows an example in which the mobile station MS is allocated successive time slots 0 and 1 from the same TDMA frame. A high-speed data signal DATAIN that is to be transmitted over the radio path is divided in a divider 82 into the required number of slower-speed data signals DATA1 and DATA2. Channel coding, interleaving, burst building and modulation 80 and 81, respectively, are performed separately on each slower-speed data signal, after which each data signal is transmitted in the form of a radio frequency burst in its dedicated time slot 0 and 1, respectively. When slower-speed data signals DATA1 and DATA2 have been transmitted separately over the radio path, demodulation, deinterleaving and channel decoding 83 and 84, respectively, are performed on them separately at the reception end, after which signals DATA1 and DATA2 are combined again into the original high-speed signal DATAOUT in a combiner 85 at the reception end.

Figure 3:
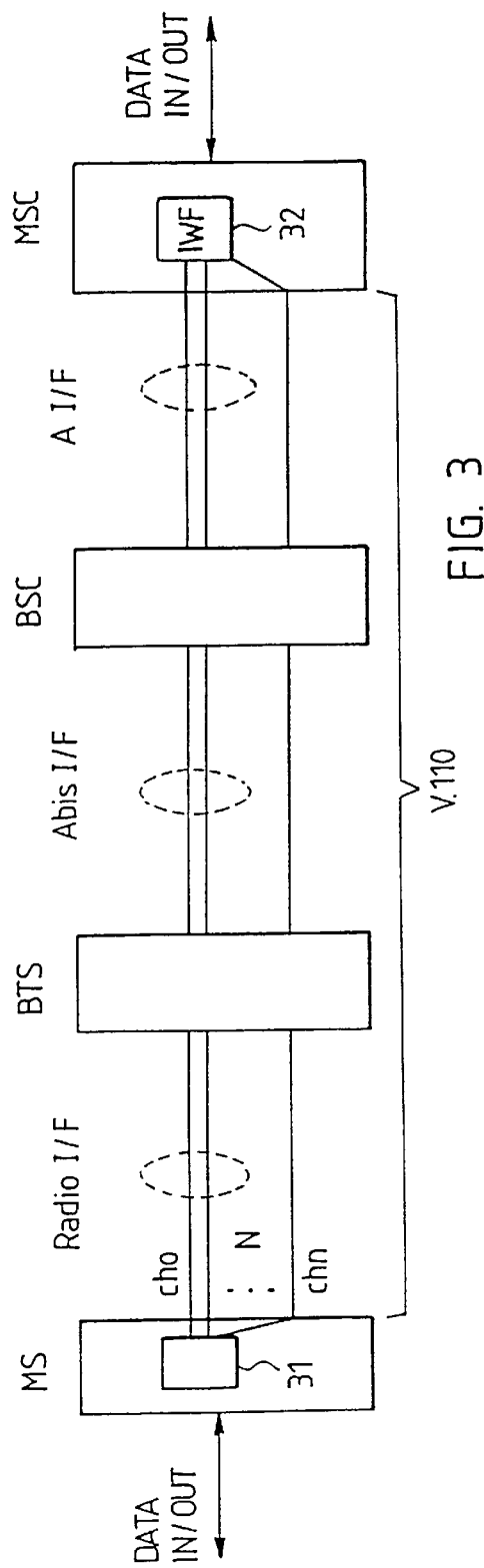
FIG. 3 illustrates the network architecture according to the invention which supports a high-speed data transmission of several traffic channels between a mobile station MS and an interworking function IWF in a GSM system.

FIG. 3 is a block diagram illustrating the architecture of the GSM network that realizes the data transmission using several parallel traffic channels. The operations of blocks 80, 81, 83 and 84 in FIG. 3, that is, channel coding, interleaving, burst; building and modulation and demodulation, respectively, deinterleaving and channel decoding are situated at the fixed network preferably in the base station BTS. The TDMA frame described above is thus transmitted between the base station BTS and the mobile station MS at the radio interface Radio I/F. The base station BTS may have a separate parallel handling for each time slot. Instead, the divider 82 and the combiner 85 in FIG. 2 may be situated, as required, in a fixed network remote from the base station BTS in another network element, whereby slower-speed data signals DATA1 and DATA2 are transferred between this network element and the base station as normal signals of traffic channels. In the GSM system, this transfer between the base station BTS and a special transcoder unit TRCU (Transcoder/Rateadapter unit) is carried out in TRAU frames according to ETSI/GSM Specification 08.60. Neither TRAU frames nor the transmission related thereto are essential to the invention, as the invention relates to carrying out data transmission and synchronizing over the whole data connection using several parallel traffic channels, that is, between the divider 82 and the combiner 85.

In the GSM system, the data connection is established between a terminal adapter 31 of the mobile station MS and an interworking function IWF 32 in the fixed network. In the data transmission of the GSM network, this connection is a digital full-duplex connection that is V.110 rate adapted, adaptable to V.24 interfaces and UDI encoded. The V.110 connection described herein is a digital transmission channel developed originally for the ISDN (Integrated Services Data Network) technology, and adapted the V.24 interface and also enables the transmission of V.24 statuses (control signals). CCITT recommendation for a V.110 rate-adapted connection is specified in CCITT Blue Book: V. 110. CCITT recommendation for V.24 interface is specified in CCITT Blue Book: V.24. In the following, description status signals are intended to refer to control signals of the V.24 interface, such as CT105, CT106, CT107, CT108 and CT109. A data terminal connected to the mobile station is adapted to the V.110 connection established over a physical connection using several traffic channels ch0 to chN by a terminal adapter 31. The interworking function IWF interconnects the V.110 connection to another V.110 network, such as the ISDN, or another GSM network, or another transit network, such as the public switched telephone network PSTN. In the first case the IWF only comprises the divider/combiner 82/85 according to the invention. In the last mentioned case, the IWF also comprises, e.g., a baseband modem with which data transmission is carried out via the PSTN.

The frame structure used in data transmission over the V.110 connection is shown in FIG. 4. A frame consists of 80 bits. Octet 0 contains binary zeros, whereas octet 5 contains a binary one followed by seven E-bits. Octets 1 to 4 and 6 to 9 contain a binary one in bit location 1, a status bit (S or X bit) in bit location 8 and 6 data bits (D bits) in bit location 2 to 7. The transmission order of the bits is from left to right and from top to bottom. Thus, there are 48 bits of D1 to D48 user data in the frame. Bits S and X are used for carrying channel control information relating to the data bits in the data transmission mode. Four status bits S1, S3, S6 and S8 are used for carrying a CT108 status signal (Data Terminal Ready) from the mobile station MS to the interworking function IWF and transmit a CT107 status signal (Data Set Ready) from the interworking function IWF to the mobile station MS. Two status bits S4 and S9 are used for carrying a CT105 status signal (Request for Sending) from the mobile station MS to the interworking function IWF, and carry a CT109 status signal (Data Channel Received Line Signal Detector) from the interworking function IWF to the mobile station MS. Two X status bits are used for carrying a CT106 status signal (Ready for Sending) or transmission synchronization or flow control information between the adapters. In case the terminal equipments are X.21 terminals, X.21 control information is carried the S-bits. A filtering procedure is provided in the mobile station MS for receiving the CT106 and CT109 statuses and the X.21 indication.

According to the present invention, some of these control bits of the V.110 frame are reassigned so as to carry the synchronization information required for managing the data transmission over several parallel traffic channels ch0 to chN. As the CT108 and CT107 statuses, as well as the X.21 control information, can be carried in one S bit, when needed, three S bits will remain redundant. The CT105 and CT109 statuses, as well as the X.21 information, can also be carried in one S bit, whereby one more S bit will become redundant. The information carried by the X bits can be carried in one X bit, whereby the remaining X bit will become redundant. These redundant bits can be used for the numbering of the parallel traffic channels as well as for frame numbering, as will be explained below with reference to FIG. 5.

Figure 5:
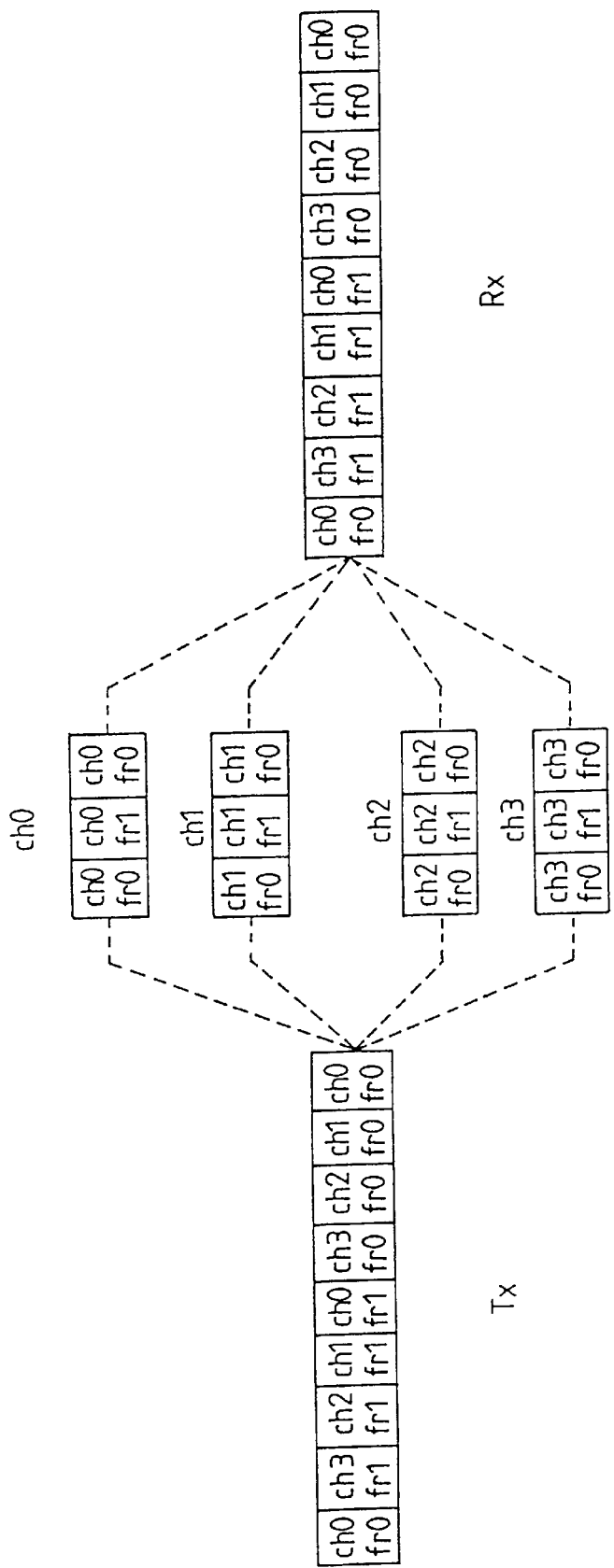
FIG. 5 illustrates the use of channel and frame numbering according to the invention for dividing the frames into several parallel traffic channels ch0 to ch3 at the transmission end Tx and for reassembling the frames at the reception end Rx.

In an example case illustrated in FIG. 5 the high-speed data transmission is carried out via four parallel traffic channels. The transmission end Tx and the reception end Rx refer to the divider 82 and the combiner 85 in the mobile station MS and in the interworking function IWF. At the beginning of a data call the four traffic channels are allocated to the data call, channel numbers ch0, ch1, ch2 and ch3 are assigned to the channels by the transmitter Tx for the duration of the call and the establishment of the connection and the synchronization of the V.110 connection are carried out for each channel separately in a manner specified in the GSM Specifications. When the transmitter Tx detects that all the traffic channels have been synchronized and entered a V.110 data transmission mode, it starts the high-speed data transmission according to the invention. The transmitter provides each frame with the channel number of the traffic channel via which the frame will be transmitted. Furthermore, the transmitter Tx uses internal frame numbering inside each frame. 1-bit frame numbering is used in FIG. 5, that is, frame numbers fr0 and fr1 are alternating in each traffic channel. As a result, the transmitter Tx divides the incoming data into successive frames in which the following channel and frame numbering are repeated in a sequence of eight frames: (ch0, fr0), (ch1, fr0), (ch2, fr0), (ch3, fr0), (ch0, fr1), (ch1, fr1), (ch2, fr1), (ch3, fr1). The transmitter Tx divides these frames into parallel channels ch0 to ch3 in the sequential order, the first frame into the first channel, the second frame into the second channel, etc. For example, in FIG. 5 the first frame (ch0, fr0) is inserted into channel ch0, the second frame (ch1, fr0) is inserted into channel ch1, the third frame (ch2, fr0) is inserted into channel ch2, the fourth frame (ch3, fr0) is inserted into channel ch3, the fifth frame (ch0, fr1) is inserted again into channel ch0, etc. Due to the frame numbering, frames with numbers fr0 and fr1 are alternating in each channel.

The receiver Rx receives the frames described above from parallel traffic channels ch0 to ch3 and restores the frames into the original order by using the channel and frame numbering transmitted in the frames. In other words, the receiver Rx selects frame (ch0, fr0) as the first frame from channel ch0, frame (ch1, fr0) as the second frame from channel ch1, etc. Thus, due to channel and frame numbering according to the invention, the receiver Rx may identify the frames and their correct transmission order unambiguously. The frame numbering of the invention allows a relative transmission delay between parallel channels, which is at the maximum two frames in length, without losing the order of the frames in the receiver Rx. This is sufficient for most applications. The allowed delay offset can be extended, when needed, by increasing frame numbering. The receiver extracts the actual data bits from the frames restored in the correct order, 48 bits from each frame and combines the data bits into the original high-speed signal.

In the following, a few examples are given of how the status bits of the V.110 frame can be selected for the channel and frame numbering of the invention.

For example, bits S1, S4 and S6 may be used for channel numbering and frame numbering will not be used at all. In another case, bits S1, S4 and S6 may be used for channel numbering (8 channels) and one of the X bits for 1-bit frame numbering within the channel. Further, status bits S4 and S6 may be used for channel numbering and one of the X bits and bit S3 for 2-bit frame numbering within the channel. There are also many other possibilities to use redundant bits for channel and frame numbering. The actual bit rate of each status bit has to be taken into consideration when selecting the bits. For example, if three of bits S1, S3, S6 and S8 are used for channel and/or frame numbering, the rate of the CT107 and CT108 status signals falls to a fourth of the original rate in one channel. If only two parallel channels are used then, the total CT107 and CT108 rate is half of the original rate and it will have an effect on the filtering of status signals in the reception. In the examples above, the replication of the CT107 and CT108 bits is accomplished in several traffic channels (from two channels onwards) and therefore the fact that each frame of the parallel traffic channels has a smaller number of replicated status bits will have no effect on the bit error ratio of these status bits.

As noted above, the present invention is universally applicable on various kinds of multiple access methods and traffic channels. In CDMA systems, the traffic channels are defined by pseudorandom noise (PN) codes, i.e. spreading codes, assigned to each user or connection. From the present invention point of view, the CDMA traffic channel is similar to the TDMA traffic channel. The basic contribution of the present invention is a channel and frame numbering as means for dividing the high-speed data flow between parallel transparent traffic channels and syncronizing the reassembling of data received from the traffic channels, as illustrated in FIG. 5.

Figure 6:
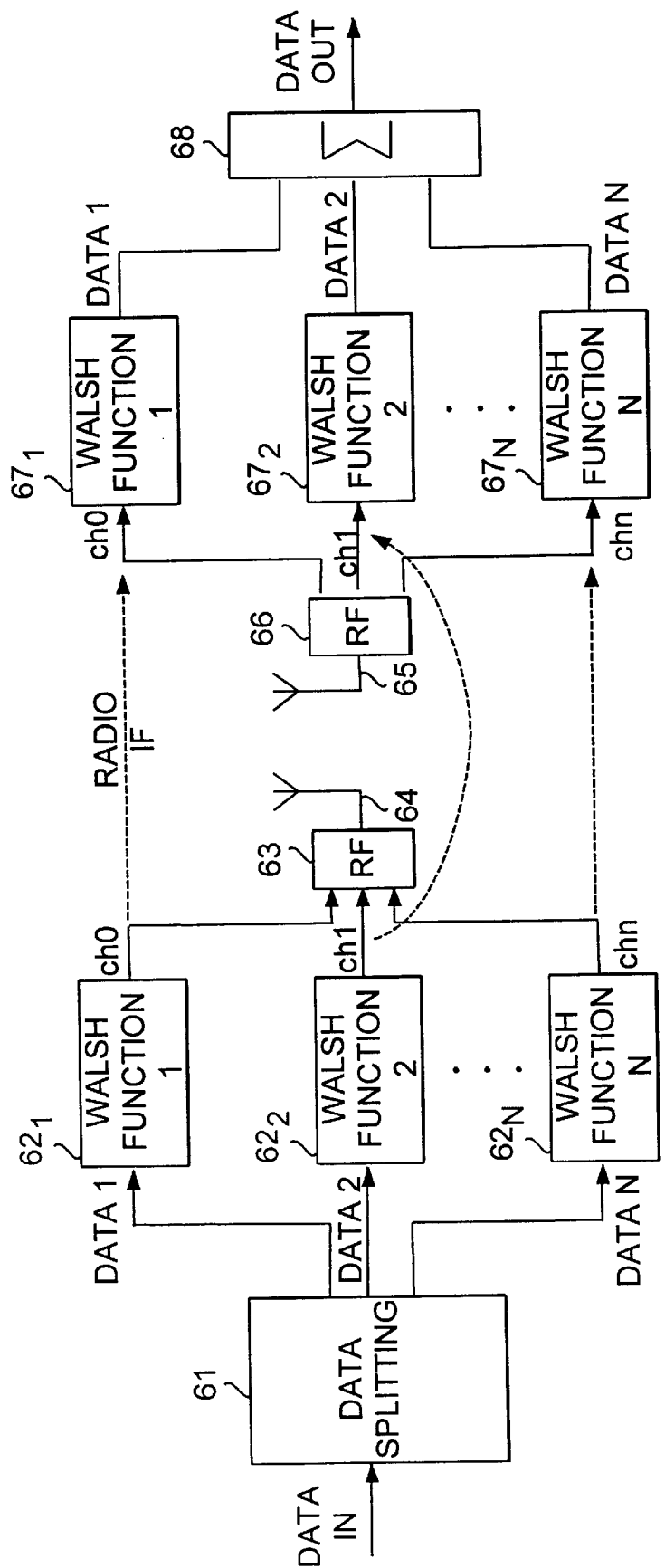

High-speed data transmission according to the present invention over N parallel CDMA traffic channels is illustrated in FIG. 6. A high-speed data signal DATAIN that is to be transmitted over the radio path is divided in a data splitter 61 into the required number of slower-speed data signals DATA1 . . . DATAN. A respective number N of parallel CDMA traffic channels ch . . . chn is allocated for the transmission. In other words, an unique spreading code is allocated for each slower-speed signal DATA1 . . . DATAN in order to distiquish them from each other during simultaneous transmission over the radio interface. The spreading codes of the system are preferably selected in such a way that the codes used in each system cell are mutually orthogonal, i.e. they do not correlate with each other. One class of suitable orthogonal binary sequences is called the Walsh function. In the embodiment shown in FIG. 6, the traffic channel separation is done by coding (multiplying) each lower-speed data stream DATA1 . . . DATAN by modified Walsh functions . . . N of length 255 in respective Walsh encoders $62_1$ . . . $62_N$, in order to spread the data streams in bandwidth. The Walsh function is modified so that the last bits of all of the functions have been deleted. The spread-spectrum data streams are fed to through radio frequency (RF) parts 63 to an antenna 64 for transmission over the radio interface.

The RF signal received at receiving antenna 65 is fed through radio frequency (RF) parts 66 and splitted in parallel to correlator branches $67_1$ . . . $67_N$. Correlators $67_1$ . . . $67_N$ are Walsh decoders each of which decodes (multiplies) the received spread-spectrum signal by the Walsh function 1 . . . N of the respective CDMA traffic channel ch . . . chn, in order to despread the signal in bandwidth and to restore the original bandwidth of the respective slow-speed data stream DATA1 . . . DATAN. The restored slow-speed data streams DATA1 . . . DATAN are combined in a combiner 68 into a high-speed data stream DATAOUT.

The data transmission according to the present invention through the parallel CDMA traffic channels can thus be carried out in a manner shown in FIG. 5, for example. In the CDMA System, channel numbering may be implicitly done by using the numbering of the spreading codes, such as the Walsh codes. The frames are are not necessarily provided with a dedicated channel number. Instead, the frames will be transmitted through these "tubes" of the physical layer, a dedicated Walsh code being assigned to each tube (traffic channel). Consequently, the Walsh code (i.e. the code channel number) used in the transmission and reception implicitely indicates the order of the frames. In the reception end, the frames will be forwarded in a correct order accoding to the Walsh code.

Typically, there are various coding and signal processing operations, such as channel coding (convolutional coding), symbol repetition, interleaving, etc., involved with the data transmission. These additional operations are not essential in the point of view of present invention. In the embodiment of FIG. 6, it is assumed that these coding and interleaving operations, if any, are done to the high-speed data streams DATAIN and DATAOUT prior to the data splitting 61 and subsequent to data combining 68.

Figure 7A:
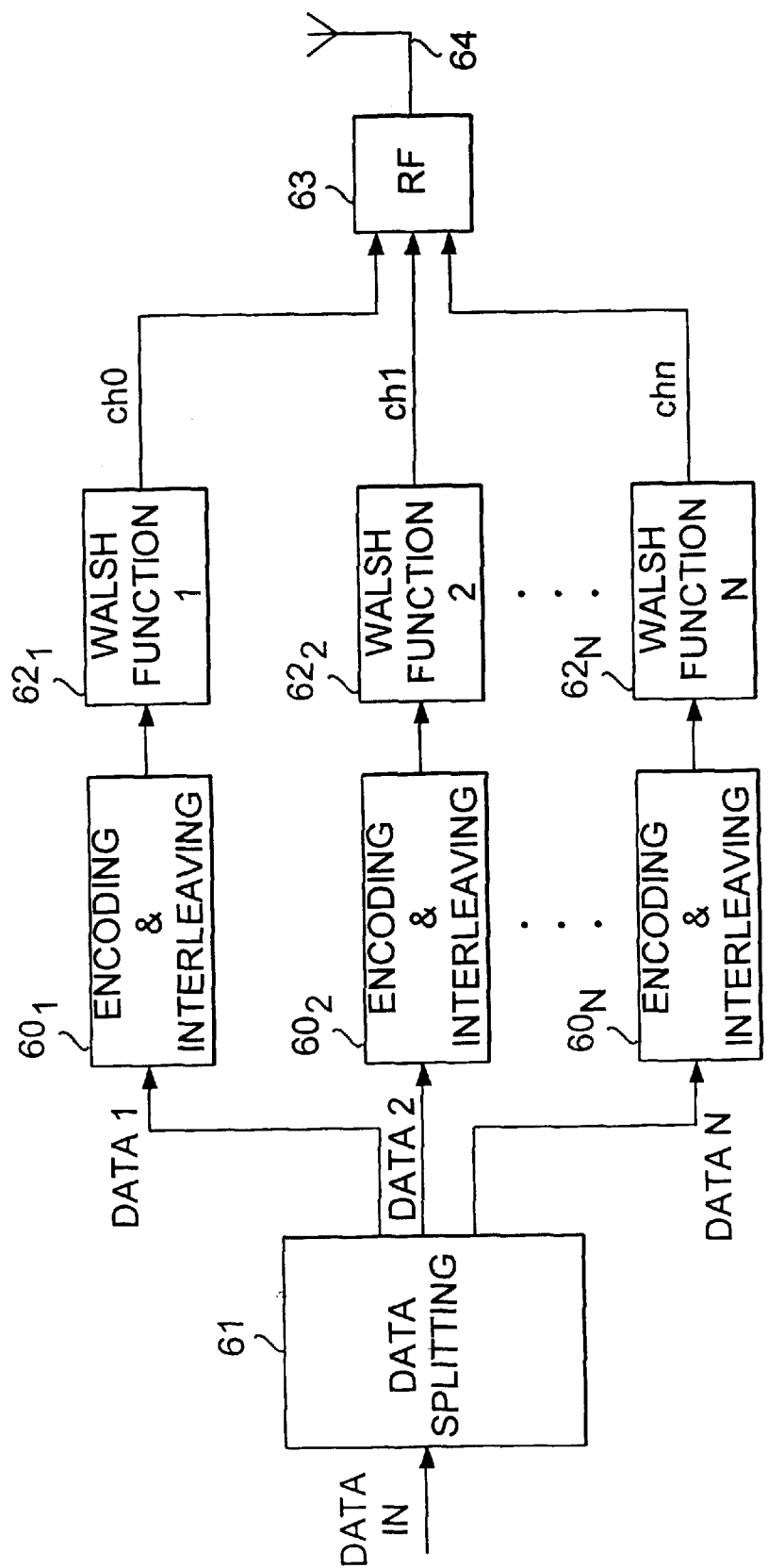

In another embodiment, illustrated in FIGS. 7A and 7B, the channel coding, interleaving and other additional operations are done separately on each slow-speed data stream DATA1 . . . DATAN. To this end, encoding and interleaving blocks $60_1$ . . . $60_N$ are provided between the data splitter 61 and the Walsh encoders $62_1$ . . . $62_N$ in the transmitter of FIG. 7A. Similarly, decoding and deinterleaving blocks $69_1$ . . . $69_N$ are provided between the Walsh decoders $67_1$ . . . $67_N$ and the data combiner 68 in the receiver of FIG. 7B.

Figure 8:
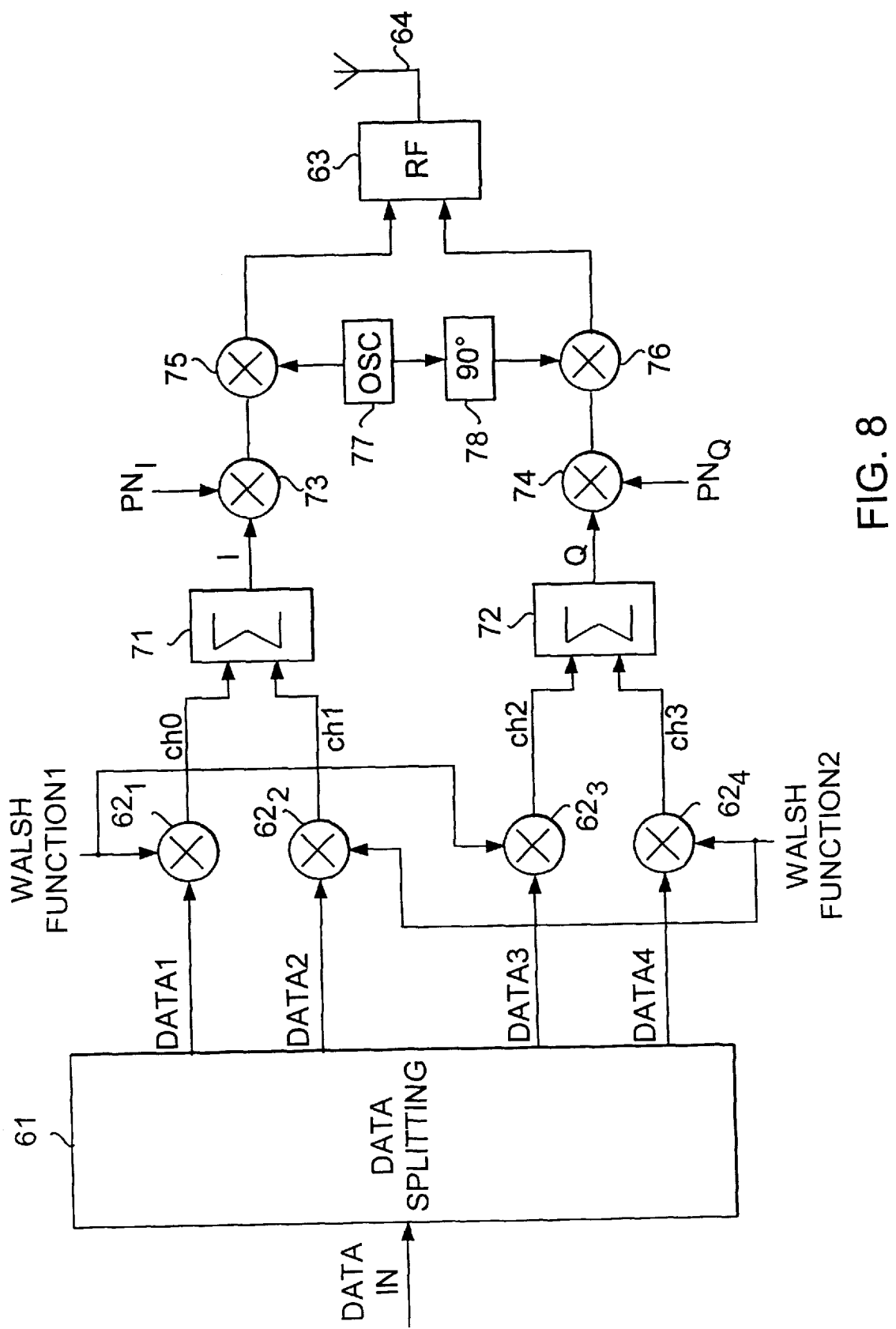
FIG. 8 shows a CDMA transmitter in which four CDMA traffic channels can be divided between quadrature (Q) and in-phase (I) branches in a QPSK modulator.

The RF parts 63 and 66 normally comprise transmitting and receiving filters. Often also, a QPSK (Quadrature Phase Shift Keying) modulator is used. FIG. 8 show an example of how four channels can be divided between quadrature (Q) and in-phase (I) branches in a QPSK modulator. High-speed data signal DATAIN is split into slow-speed data streams DATA1 . . . DATA4 and fed to multipliers $62_1$ . . . $62_4$ (Walsh encoders), respectively. In multipliers $62_1$ and $62_3$, data streams DATA1 and DATA3 are multiplied by Walsh funtion 1. Similarly, in multipliers $62_2$ and $62_4$, data streams DATA2 and DATA4 are multiplied by Walsh funtion 2. The outputs of multipliers $62_1$ and $62_2$ are summed in summing block 71, and fed to the I branch of the QPSK modulator. The outputs of multipliers $62_3$ and $62_4$ are summed in summing block 72, and fed to the Q branch of the QPSK modulator. The signals of the I and Q branches are multiplied by different spreading codes $PN_I$ and $PN_Q$ in multipliers 73 and 74, respectively. The actual spreading is done by these "outer" spreading codes. The resulting I and Q signals multiplied by the in-phase (from local oscillator 77) and quadrature (via 90 degree phase shifter 78 from the oscillator 77) oscillator signals, and fed through other RF parts 63 to antenna 64.

When the QPSK modulation is used, the frames will be divided into the I and Q branches so that each frame will be transmitted trough either the I branch (channel) or Q branch (channel). The I and Q information will be used in indicating the order of the frames. For example, the frames are divided into the I and Q branches in a predetermined order, first to to the I branch, the to the Q branch, again to the I branch, ie. In the reception end the frameds received from the I and Q branches will reordered according to the same predetermined order.

The figures and the description related thereto are only meant to illustrate the present invention. In its details, the invention may vary within the spirit and scope of the appended claims.

We claim:

1. A method for high-speed data transmission over an air interface between a mobile station and a fixed mobile communication network in a digital mobile communication system, said method comprising:

allocating to said mobile station at least two parallel traffic channels respectively having mutually different channel number identifiers assigned as channel numbering for the duration of a connection to a reception and, for transmission of a high-speed data signal as frames containing data, when the data transmission rate required by said high-speed data signal exceeds the maximum transmission rate of one said traffic channel;

dividing said frames into said allocated traffic channels in a respective sequential order according to said channel numbering and transmitting said frames from said mobile station acting as a transmission end, to said reception end; and reassembling said data in said frames into a high-speed data signal, based on said sequential order according to said channel numbering, at said reception end.

2. The method according to claim 1, said method further comprising:

inserting said data from said high-speed data signal into frames at said transmission end, each of said frames being provided with a channel number indicating a respective one of said parallel traffic channels to be used for said transmitting; and said reassembling includes reassembling said data in said frames into said high-speed data signal in an order indicated by said channel numbers in the said frames, at said reception end.

3. The method according to claim 1 or 2, said method further comprising:

using frame numbering inside each of said parallel traffic channels so that at least two successive frames always have a different frame number, thereby increasing maximum delay offset between said parallel traffic channels in proportion to a total number of said different frame numbers; and said reassembling includes reassembling said data in said frames into said high-speed data signal in said sequential order according to said channel numbering and indicated by said different frame numbers in said frames, at said reception end.

4. The method according to claim 1, wherein:

said digital mobile communication system is a code division multiple access (CDMA) system, and said traffic channels are CDMA traffic channels.

5. The method according to claim 4, wherein:

said CDMA traffic channels are distinguished from each other by having mutually different spreading codes relative to one another.

6. The method according to claim 4, wherein:

said CDMA traffic channels are distinguished from each other by using mutually different Walsh functions.

7. The method according to claim 5 or 6, wherein:

said channel numbering is provided by said spreading codes or said Walsh functions.

8. The method according to claim 5, said method further comprising:

utilizing quadrature phase shift keying (QPSK) in said transmitting of said frames, within each of said CDMA traffic channels;

said dividing includes dividing said frames into a quadrature QPSK branch and an in-phase QPSK branch in a predetermined order at said transmission end; and said reassembling includes reordering said data in said frames, as received from said quadrature and in-phase QPSK branches, according to said predetermined order at said reception end.

9. A digital mobile communication system, said system comprising:

at least one mobile station having a data transmitter and a data receiver;

a mobile communications network having a data transmitter and a data receiver;

said mobile communication network being arranged to allocate to said mobile station two or more parallel traffic channels having mutually different channel numbers as channel numbering, for use by said mobile station throughout a connection for transmission of a respective high-speed data signal, in frames containing data, over an air interface between said mobile station and said mobile communication network, when a transmission rate required by said high-speed data signal is higher than a maximum transmission rate of one said traffic channel, said data transmitters being arranged to insert said data from said respective high-speed data signal into frames, and to divide said frames into said allocated traffic channels in a respective sequential order according to said channel numbering; and said data receivers being arranged to reassemble said data in respective of said frames into a respective high-speed data signal based on said respective sequential order according to said channel numbering.

10. The system according to claim 9, wherein:

said data transmitters are arranged to insert said data from said respective high-speed data signal into frames, such that each frame is provided with a channel number indicating a respective one of said allocated traffic channels to be used for the respective transmission, and to divide said frames into said allocated traffic channels in sequential order according to said channel numbering; and said data receivers are arranged to reassemble said data in said frames into a respective high-speed data signal in said sequential order indicated by said channel numbers in said frames.

11. The mobile communication system according to claim 9 or 10, wherein:

said data transmitters are further arranged to provide said frames with frame numbering within each said allocated traffic channel such that at least two successive frames always have a different frame number; and said data receivers are arranged to reassemble said data in said frames into a respective high-speed data signal in said sequential order according of said channel numbering and as indicated by said frame numbers in said frames.

12. The system according to claim 9, wherein:

said digital mobile communication system is a code division multiple access (CDMA) system, and said traffic channels are CDMA traffic channels.

13. The system according to claim 12, wherein:

said CDMA traffic channels are distinguished from each other by being arranged to use mutually different spreading codes.

14. The system according to claim 12, wherein:

said traffic channels are distinguished from each other by being arranged to use mutually different Walsh functions.

15. The system according to claim 13 or 14, wherein:

said channel numbering is provided by said spreading codes or said Walsh functions.

16. The system according to claim 12, wherein:

said system is arranged to use quadrature phase shift keying (QPSK) in transmission of frames within each of said CDMA traffic channels;

said transmitters are arranged to divide said frames into a quadrature QPSK branch and an in-phase QPSK branch in a predetermined order; and said receivers are arranged to reorder said data in said frames received from said quadrature and in-phase QPSK branches according to said predetermined order.

17. A mobile station for a spread spectrum mobile communication system having capability of allocating to the mobile station two or more parallel traffic channels having mutually different channel numbers as channel numbering, for use during a connection for transmission of a high-speed data signal as frames of data over an air interface between said mobile station and said mobile communication network, when the transmission rate required for transmitting said high-speed data signal is higher than a maximum transmission rate of one said traffic channel, said mobile station comprising:

data transmitter and a data receiver;

said data transmitter being arranged to divide said frames into said parallel traffic channels in a sequential order according to said channel numbering; and said data receiver being arranged to reassemble data in frames similarly transmitted to said mobile station, into a respective high-speed data signal in said sequential order according to said channel numbering.

18. The mobile station according to claim 17, wherein:
said data transmitter is arranged to insert said data from said high-speed data signal into frames, each frame being provided with a channel number indicating a respective one of said parallel traffic channels to be used for the transmission, and to divide said frames into said parallel traffic channels in said sequential order according to said channel numbering; and
said data receiver is arranged to reassemble data in frames similarly transmitted to said mobile station, into a respective high-speed data signal in a sequential order indicated by said frame numbers in said respective frames as received by said receiver.

19. The mobile station according to claim 17 or 18, wherein:
said data transmitter is further arranged to provide the respective said frames with frame numbering within each of said allocated traffic channel so that at least two successive frames always have a different frame number; and
said data receiver is arranged to reassemble said respective data in said respective frames into said respective high-speed data signal in said respective sequential order according to said channel numbering and as indicated by said frame numbers in said respective frames.

20. The mobile station according to claim 17, wherein:
said mobile station is arranged to send and receive in a digital mobile communication system which is a code division multiple access (CDMA) system, and in which said traffic channels are CDMA traffic channels.

21. The mobile station according to claim 20, wherein:
said CDMA traffic channels are distinguished from each other by being arranged to use mutually different spreading codes.

22. The mobile station according to claim 20, wherein:
said traffic channels are distinguished from each other by being arranged to use different Walsh functions.

23. The mobile station according to claim 21 or 22, wherein:
said channel numbering is provided by said spreading codes or said Walsh functions.

24. The mobile station according to claim 20, wherein:
said mobile station utilizes quadrature phase shift keying (QPSK) in transmission and reception of frames by said data transmitter within each of said CDMA traffic channels;
said data transmitter is arranged to divide respective of said frames into a quadrature QPSK branch and an in-phase QPSK branch in a predetermined order; and
said receiver is arranged to reorder data in respective of said frames received from said quadrature and in-phase QPSK branches according to said predetermined order.

25. A method for high-speed data transmission over an air interface between a mobile station and a fixed mobile communication network in a digital mobile communication system, said method comprising:
allocating to said mobile station at least two parallel traffic channels respectively having mutually different channel number identifiers assigned as channel numbering for the duration of a connection to a reception end, for transmission from a transmission end of a high-speed data signal as frames containing data, when a data transmission rate required by said high-speed data signal exceeds a maximum transmission rate of one said traffic channel;
inserting said data from said high-speed data signal into frames at said transmission end, each of said frames being provided with a channel number indicating a respective one of said parallel traffic channels used for said transmission;
dividing said frames into said allocated traffic channels in a sequential order according to said channel numbering, and transmitting said frames to a reception end; and
reassembling said data in said frames, at said reception end, into a high-speed data signal in said sequential order indicated by said channel numbers in said frames.

26. A method for high-speed data transmission over an air interface between a mobile station and a fixed mobile communication network in a digital mobile communication system, said method comprising:
allocating to said mobile station at least two parallel traffic channels respectively having mutually different channel numbers identifiers assigned as channel numbering for the duration of a connection to a reception end for transmission from a transmission end of a high-speed data signal as frames containing data, when a data transmission rate required by said high-speed data signal exceeds a maximum transmission rate of one said traffic channel;
inserting said data from said high-speed data signal into frames at said transmission end, each of said frames being provided with a channel number indicating a respective one of said parallel traffic channels to be used for said transmission;
dividing said frames into said allocated traffic channels in a sequential order according to said channel numbering;
using frame numbering inside each of said allocated traffic channels so that at least two successive frames always have a different frame number, thereby increasing maximum delay offset between said allocated traffic channels in proportion to a total number of said different frame numbers;
transmitting said frames to said reception end; and
reassembling said data in said frames, at said reception end, into a high-speed data signal in said sequential order according to said channel numbering and said frame numbering in said frames.

27. A digital mobile communication system, said system comprising:
at least one mobile station having a data transmitter and a data receiver;
a mobile communications network having a data transmitter and a data receiver;
said mobile communication network being arranged to allocate to said mobile station two or more parallel traffic channels having mutually different channel numbers as channel numbering for use during a connection for transmission of high-speed data signals over an air interface between said mobile station and said mobile communication network, when a transmission rate required by a respective said high-speed data signal is higher than a maximum transmission rate of one said traffic channel;

said data transmitters being arranged to insert said data from said high-speed data signal into frames, each frame being provided with a channel number indicating a respective one of said allocated traffic channels to be used for said transmission;

said data transmitters further being arranged to provide said frames with frame numbering within each of said allocated traffic channel so that at least two successive frames always have a different frame number;

said data transmitters further being arranged to divide said frames into said allocated traffic channels in said sequential order according to said channel numbering; and said data receivers being arranged to reassemble said data in respective of said frames into respective high-speed data signals in said sequential order according to said channel numbering and according to said frame numbering in respective of said frames.

* * * * *